United States Patent [19]

Wormsbecher

[11] Patent Number: 4,920,087

[45] Date of Patent: Apr. 24, 1990

[54] VANADIUM SCAVENGING COMPOSITIONS

[75] Inventor: Richard F. Wormsbecher, Baltimore, Md.

[73] Assignee: W. R. Grace & Co.-Conn., New York, N.Y.

[21] Appl. No.: 165,696

[22] Filed: Mar. 9, 1988

Related U.S. Application Data

[63] Continuation of Ser. No. 739,645, May 31, 1985, abandoned, which is a continuation-in-part of Ser. No. 487,165, Apr. 21, 1983, abandoned, and Ser. No. 689,280, Jan. 7, 1985, abandoned.

[51] Int. Cl.$^5$ .......................... B01J 21/08; B01J 21/10
[52] U.S. Cl. .................................. 502/68; 502/69; 502/234; 502/251; 208/251 R
[58] Field of Search .................... 502/63, 64, 68, 69, 502/79, 251, 340, 252, 234; 208/251 R, 251 H, 216 PP

[56] References Cited

U.S. PATENT DOCUMENTS

| | | | |
|---|---|---|---|
| 4,444,655 | 4/1984 | Shiroto et al. | 208/210 |
| 4,465,779 | 8/1984 | Occelli et al. | 502/63 |

*Primary Examiner*—Olik Chaudhuri
*Attorney, Agent, or Firm*—Arthur P. Savage

[57] ABSTRACT

Catalytic cracking catalysts which contain a basic alkaline earth metal component in amounts greater than 5 percent by weight (expressed as the oxides) are used to crack hydrocarbon feedstocks that contain substantial quantities of metals such as vanadium, nickel, copper and iron. In a particularly preferred embodiment natural or synthetic particulate magnesium oxide (MgO) containing composites such as dolomite or a formed particulate coprecipitated magnesia-silica cogel (MgO-$SiO_2$) having a substantial intra-particle pore volume in pores ranging from about 200–10,000 Å in diameter and an average pore diameter greater than about 400 Å in the 200–10,000 Å diameter range is mixed with a zeolite containing fluid cracking catalyst (FCC) either as an integral component of the catalyst particle or as a separate additive.

12 Claims, No Drawings

VANADIUM SCAVENGING COMPOSITIONS

This application is a continuation of U.S. Ser. No. 739,645, filed May 31, 1985, which is a continuation-in-part of U.S. Ser. Nos. 487,165 filed Apr. 21, 1983 and 689,280 filed Jan. 7, 1985, all now abandoned.

The present invention relates to catalytic cracking catalysts, and more specifically to cracking catalyst compositions which are particularly effective for the cracking of residual type hydrocarbon feedstocks.

In recent years, the refining industry has been required to process ever increasing quantities of residual type feedstocks. These heavy feedstocks are frequently contaminated with substantial quantities of metals such as vanadium, nickel, iron and copper which adversely affect cracking catalyst used in refinery operations.

Zeolite containing cracking catalysts in particular are susceptible to deactivation (poisoning by vanadium) and in addition the catalytic selectivity of the catalyst is adversely affected by the presence of iron, copper and nickel.

U.S. Pat. No. 3,835,031 and U.S. Pat. No. 4,240,899 describe cracking catalysts which are impregnated with Group IIA metals for the purpose of reducing sulfur oxide emissions during regeneration of the catalyst.

U.S. Pat. No. 3,409,541 describes catalytic cracking processes wherein deactivation of the catalyst by contaminating metals is decreased by adding to the catalytic inventory a finely divided alkaline earth or boron type compound which reacts with the metal contaminants to form an inert product that may be removed from the catalytic reaction system.

U.S. Pat. No. 3,699,037 discloses a catalytic cracking process wherein a finely divided additive such as calcium and magnesium hydroxides, carbonates, oxides, dolomite and/or limestone is added to the catalyst inventory to sorb $SO_x$ components present in the regenerator flue gas.

U.S. Pat. No. 4,198,320 describes catalytic cracking catalyts which contain colloidal silica and/or alumina additives that are added for the purpose of preventing the deactivation of the catalyst when used to process metals containing feedstocks.

U.S. Pat. No. 4,222,896 describes a metals-tolerant zeolite cracking catalyst which contain a magnesia-alumina-aluminum phosphate matrix.

U.S. Pat. No. 4,283,309 and 4,292,169 describe hydrocarbon conversion catalysts which contain a metals-absorbing matrix that includes a porous inorganic oxide such as alumina, titania, silica, circonia, magnesia and mixtures thereof.

U.S. Pat. No. 4,465,779 discloses cracking catalyst compositions which comprise a high activity catalytic cracking catalyst and as a separate and distinct entity a magnesium compound or magnesium compound in combination with a heat stable compound.

U.S. Pat. No. 4,432,890 and 4,469,588 discloses catalytic cracking catalyst compositions which are used to crack hydrocarbon oild feedstocks that contain significant quantities of vanadium which comprise a zeolite and an amorphous invert solid matrix containing a metal additive such as magnesium which may be introduced into the catalyst during manufacture or during use in the conversion of hydrocarbons.

PCT WO 83/00105 discloses cracking catalysts that are resistant to metals poisoning which comprise two particulate size fractions, and an $SO_x$ absorbing additive such as aluminum oxide, calcium oxide and/or magnesium oxide.

While the prior art suggests several catalytic systems and compositions which are effective in controlling the adverse poisoning effects of metals contained in several type feedstocks or limiting $SO_x$ emissions during regeneration of the catalyst, many of the systems require the use of expensive additives and/or processing systems and are not particularly cost effective when operated on a commercial scale.

It is therefore an object of the present invention to provide improved catalytic cracking catalysts which are capable of cracking hydrocarbon feedstocks that contain substantial quantities of metals and sulfur.

It is another object to provide fluid cracking catalysts (FCC) which are resistant to metals poisoning and which may be recharged and used in large quantities at reasonable cost.

It is a further object to provide a catalytic cracking process which is capable of handling large quantities of metals, vanadium in particular, without substantial loss of activity or product yield.

These and stil further objects of the present invention will become readily appaent to one skilled in the art from the following detailed description and specific examples.

Broadly, my invention contemplates catalytic cracking catalysts which include a basic alkaline earth metal component in amounts ranging from about 5 to 80 weight percent expressed as the oxides, wherein the catalyst is capable of maintaining a high degree of activity when associated with substantial quantities of deactivating metals such as vanadium deposited on the catalyst.

More specifically, I have found that particulate basic alkaline earth metal compositions which have an intraparticle pore structure characterized by a pore volume of at least 0.1 cc/g in pores having a diameter of about 200 to 10,000 Å, and an average pore diameter (APD) of greater than about 400 Å when determined in the pore size range of about 200 to 10,000 Å diameter using the relationship:

$$APD = \frac{4 \times 10^4 \times PV}{SA}$$

wherein PV=pore volume in cc/g in pores ranging from 200–10,000 Å diameter and SA=surface area in m²/g in pores ranging from 200–10,000 Å diameter, as determined by mercury porosimetry.

The alkaline earth metal compound used in the practice of the invention is selected from group IIA of the periodic Table with calcium and magnesium being preferred and magnesium the most preferred. In a particularly preferred embodiment of the invention the basic alkaline earth metal component comprises natural or synthetic dolomite which has the general chemical formula $MgCa(CO_3)_2$, MgO, or magnesia-silica gels and a significant pore volume in pores greater than about 400 Å at process temperatures of 1400° F. or so.

In a particularly preferred embodiment a magnesium oxide containing component such as a magnesia-silica gel ($MgO \cdot SiO_2$) is prepared in a particulate form wherein the particle has a substantial pore volume in pores having a diameter of greater than about 400Å. The resulting $MgO \cdot SiO_2$ composition is included in a FCC catalyst composition either as an integral component of the FCC catalyst particle or more preferably as a separate particulate additive in amounts ranging from about 2.5 to 40 by weight of the composition.

The preferred MgO.SiO$_2$ gel has the overall weight composition of 30-80% MgO, and a pore volume in pores greater than about 400 Å diameter of at least 0.1 cc/g and preferably from about 0.2 to 1.0 cc/g. Where the MgO.SiO$_2$ gel is added to a FCC catalyst as a separate particulate additive, the particle size and density of the additive is preferably similar to that of the FCC catalyst, i.e. particle size range of about 40 to 80 microns and an average bulk density of 0.5 to 1.0 g/cc.

A preferred MgO.SiO$_2$ gel is prepared by reacting aqueous sodium silicate and magnesium chloride solutions at a temperature of about 15° to 50° C. to form a precipitate gel which is recovered by filtration, reslurried in water and spray dried at a temperature of about 330° to 500° C. Furthermore, particulate MgO can be added to the MgO.SiO$_2$ gel to give composition of 30-80% MgO to the final product.

As indicated above, the MgO containing catalyst component must have the optimized pore structure described above in order to be effective for vanadium scavenging. This is due to the fact that partial molar volume of magnesium vanadate is greater than magnesium oxide. It is believed that the vanadium poisoning of cracking catalysts is caused by the poison precursor H$_3$VO$_4$ which is formed in the regeneration step from the reaction of V$_2$O$_5$ and steam (for vapor pressure data see L. N. Yannopoulos, *J. Phys. Chem.* 72, 3293 (1968). H$_3$VO$_4$ is isoelectronic with H$_3$PO$_4$ and is most probably a strong acid. H$_3$VO$_4$ therefore destroys the zeolite crystallanity and activity by acid hydrolysis of the SiO$_2$—Al$_2$O$_3$ framework of the zeolite. As H$_3$VO$_4$ reacts with MgO and forms (MgO)$_2$V$_2$O$_5$ on the surface of pore, the surface of the pore will swell due to larger molar volume of (MgO)$_2$V$_2$O$_5$. If the pore is too small, blocking will occur readily and thereby inhibit the further reaction with H$_3$VO$_4$. We have experimentally determined that the average pore diameter must be greater than 400 Å or so to be effective. This effect has been extremely studied with similar reaction:

$$CaO + SO_3 \rightarrow CaSO_4$$

(see S. K. Bhatia and D. D. Perlmutter AIChE J. 27, 266 and 29, 79).

As indicated above, MgO is the preferred oxide over the other alkaline earths when used in conjunction with FCC catalysts. This is due to the presence of sulfur oxides in the flue gases of the regenerator, which can compete with H$_3$VO$_4$ forming alkaline earth SO$_4$'s as shown by a consideration of the equilibrium constants for the reactions of MgSO$_4$ and CaSO$_4$ with vanadic acid. Assuming a worst case test in which all of the SO$_x$ is assumed to be SO$_3$ at a typical level of 2000 ppm in the regenerator, 20% H$_2$O, 1.07 ppm H$_3$VO$_4$ and a temperature of 970° K. (1285° F.) a calculated equilibrium constant (assuming unit activity for the condensed phases) from the regenerator conditions above can be compared to the equilibrium constant for the two reactions from thermochemical data as follows:

2 CASO$_4$(S)+2 H$_3$VO$_4$(g)=(CaO)$_2$V$_2$O$_5$(S)+2 SO$_3$(g)+3 H$_2$O(g) K (970° K.)=472.75

2 MgSO$_4$(S)+2 H$_3$VO$_4$(g)=(MgO)$_2$V$_2$O$_5$(S)+2 SO$_3$(g)+3 H$_2$O(g) K(970° K.)=6.675×10$^5$ $$K_{calc} = \frac{[SO_3]^2[H_2O]^3}{[H_3VO_4]^2}$$

$$= 2.215 \times 10^5$$

For the case of calcium the calculated equilibrium from regenerator conditions is much greater than the equilibrium constant for the reaction. By the Le Chatlier's principle the reaction will favor the left hand side of reaction with calcium. The opposite is true for the case with MgO. If calcium is used CaSO$_4$ will be preferentially formed over the vanadate, the opposite is true for magnesium.

The fluid catalytic cracking catalysts which are combined with the basic alkaline earth metal component, are conventional and well known to those skilled in the art. Typically, the catalysts comprise amorphous inorganic oxide gels such as silica-alumina hydrogels, and/or a crystalline zeolite dispersed in an inorganic oxide matrix.

Preferred zeolites are synthetic faujasite (type Y zeolite) and/or shape selective zeolites such as ZSM-5. Type Y zeolites which are exchanged with hydrogen and/or rare earth metals such as HY and REY, and those which have been subjected to thermal treatments such as calcined, rare-earth exchanged Y (CREY) and/or Z14US are particularly suited for inclusion in fluid cracking catalyst compositions. Catalytically active zeolite components are typically described in U.S. Pat. Nos. 3,293,192 and RE 28,629.

In addition to an active zeolie component, the catalysts contain an inorganic oxide matrix. The inorganic oxide matrix is typically a silica-alumina hydrogel, which may be combined with substantial quantities of clay such as kaolin. In addition, it is contemplated in catalyst matrix systems which comprise silica, alumina, silica-alumina sols and gels may be utilized in the practice of the present invention. Methods for producing suitable catalyst compositions are described in U.S. Pat. Nos. 3,974,099, 3,957,689, 4,226,743, 3,867,308, 4,247,420, and U.S. Ser. No. 361,426 filed Mar. 24, 1982.

The basic alkaline earth metal component may be added to the catalytic composition in the form of a finely divided particulate solid or the component may be added in the form of a salt which is subsequently converted to a solid oxide. Magnesium and calcium oxides, hydroxides, carbonates or sulfates are particularly suited forms of the basic alkaline earth metal components which are added to the catalyst either during or after manufacture. In one preferred embodiment, the basic alkaline earth containing component is physically admixed with the particulate catalyst. In another preferred embodiment, the alkaline earth metal component is included in the catalyst composition (matrix) during manufacture. In order to obtain the maximum degrees of metals tolerance while avoiding undue deactivation of a zeolite component which may be present in the catalyst, the alkaline earth metal component is added to the zeolite containing catalyst in a form that does not ion exchange with the zeolite component.

In a typical FCC catalyst preparation procedure in which the component is added to the catalyst composition, a finely divided alkaline earth metal component, such as dolomite, is blended with an aqueous slurry which contains silica-alumina hydrogel, optimally a zeolite, and clay to obtain a pumpable slurry which is then spray dried to obtain microspheroidal particles of catalyst having a particle size ranging from about 20 to 100 microns. The spray dried catalyst, which typically contains from about 0 to 35 percent by weight zeolite, 25 to 70 percent by weight clay, and 10 to 50 percent by weight matrix binder, such as silica, alumina, silica-alumina hydrogel or sol, and from 5 to 80 percent by weight alkaline earth metal component, is washed and ion exchanged to remove soluble impurities such as sodium and sulfates. After drying to about 10–30 percent total volatiles the catalyst is ready to be used in conventional catalytic cracking processes. Typical FCC processes involve contact of the catalyst with a hydrocarbon feedstock which may contain significant quantities, i.e. from 1 to 200 ppm of vanadium and other metals such as nickel, iron and copper at temperatures on the order of 900° to 1000° F. to obtain cracked products of lower molecular weight such as gasoline and light cycle oil.

It is found that during the catalytic cracking process, the catalysts contemplated in the present invention can sorb in excess of 0.1 percent and up to 10 percent by weight of metals, particularly vanadium, while maintaining an acceptable level of activity and product selectivity. Typical "conventional" catalysts, which do not contain the alkaline earth metal component contemplated herein, lose substantial activity when the metals content (vanadium in particular) exceeds about 0.1 weight percent.

Having described the basic aspects of the present invention, the following examples are given to illustrate the specific embodiments thereof.

EXAMPLE 1

Catalyst A was prepared by mixing about 10 percent by weight calcined rare earth exchanged type Y zeolite (CREY) that has been ammonium sulfate exchanged to contain 0.6 weight percent $Na_2O$ and 13 weight percent $RE_2O_3$ with 10 percent by weight dolomite, and 80 percent by weight kaolin clay. The mixture was combined with small quantities of water and then extruded with one-eighth inch diameter extrudates. The extrudates were oven dried, crushed and sized to obtain a particle size fraction ranging from 60 to 150 mesh (100 to 200 microns). A comparison Catalyst B was prepared using a similar technique, however, the dolomite component was omitted and replaced with clay. Catalyst B therefore comprised 10 percent by weight REY and 90 percent by weight kaolin. A first set of samples of each Catalyst A and B was impregnated with a water solution. A second set of samples of Catalysts A and B were impregnated to a level of 0.67 weight percent vanadium, using a solution which contained vanadyl oxylate dissolved in water. All samples were then pretreated at 900° F. for 1 hour and then 2 hours at 1400° F. to burn off residual organic material. The catalyst samples were then subjected to a hydrothermal deactivation treament which involved contacting the catalyst with 100 percent steam at a pressure of 2 atm at 1350° F. for 8 hours. The dolomite used in this example has a PV (200–10,000)=0.385 cc/g and APD (200–10,000)=1,349 Å after heat treatment at 1400° F. for 2 hours. The catalysts of this Example (as well as the catalysts evaluated in additional Examples) were then tested for catalytic cracking activity using the microactivity test described in ASTM D-3907. The microactivity (MA) of the catalyst samples is expressed in terms of volume percent (vol. %) of feedstock converted. The results are summarized in Table I set forth below.

TABLE I

| Catalyst (Sample No.) | V Content, wt. % | MA, vol. % |
|---|---|---|
| A (1) | 0 | 60.1 |
| A (2) | 0.67 | 56.1 |
| B (1) | 0 | 70.8 |
| B (2) | 0.67 | 13.2 |

EXAMPLE 2

A series of catalyst samples was prepared which contained 10 percent by weight calcined rare earth exchanged Y (CREY) which contained 3.2 percent $Na_2O$ and 14.9 percent $RE_2O_3$, a silica-alumina cogel which contained 72 percent by weight alumina, and various quantities of clay and dolomite.

The silica-alumina cogel component was prepared as follows: A sodium silicate solution which contained 4 weight percent sodium silicate having the formula $3.36 SiO_2.Na_2O$, a 4 weight percent sodium aluminate solution, and 20 weight percent sulfuric acid solution were mixed together such that the final pH of the cogel slurry was 10.0. The flow rates of above solutions were adjusted to give a final product composition of 72% $Al_2O_3$, 28% $SiO_2$.

Varying amounts of clay, dolomite, and Crey were then mixed with the cogel slurry. The slurry was filtered, then reslurried with water to 15% solids content. This slurry was then spray dried to give microspheroidal catalyst particles of 12 to 100 microns (60 microns average). The catalyst was then washed to remove sodium ions and sulfates, using water, 10 percent ammonium sulfate solution, and then 5 percent ammonium carbonate solution.

The catalyst samples were then impregnated with various quantities of water and vanadium and evaluated using the techniques described in Example 1. The dolomite has the same pore structure characteristics as in Example 1. The composition of the catalysts and the microactivity test results for catalyst samples having various quantities of vanadium are summarized in Table II below. In addition, the quantities of hydrogen ($H_2$) and coke (C) produced during the microactivity test were determined.

TABLE II

| Catalyst | A | B | C | D |
|---|---|---|---|---|
| Composition, Component, wt. % | | | | |
| Cogel | 50 | 30 | 30 | 50 |
| CREY | 10 | 10 | 10 | 10 |
| Clay | 40 | 30 | 20 | 10 |
| Dolomite | 0 | 10 | 20 | 30 |
| Microactivity (vol. %) | | | | |
| V content, wt. % | | | | |
| 0.0 | (74.3) | (79.9) | (70.2) | (68.5) |
| % $H_2$/% C | .12/3.2 | 0.11/3.1 | .12/2.8 | .12/3.2 |
| 0.34 | (56.6) | (70.4) | (66.9) | (65.0) |
| % $H_2$/% C | .51/3.2 | 0.21/2.7 | .12/2.9 | .13/3.0 |
| 0.67 | (53.4) | (52.2) | (70.8) | (60.5) |
| % $H_2$/% C | .65/4.1 | 0.34/3.6 | .13/3.1 | .13/3.1 |
| 1.34 | (20.6) | (45.2) | (69.3) | (65.5) |
| % $H_2$/% C | .82/4.8 | 0.38/3.1 | .14/2.7 | .11/2.6 |

The data set forth in Tables I and II clearly indicates that the inclusion of basic alkaline earth component (dolomite) results in catalyst compositions which are capable of maintaining a high degree of activity when combined with quantities of vanadium which significantly deactivate conventional catalysts. Furthermore, it is noted that the inclusion of dolomite does not significantly adversely affect the product distribution, i.e., $H_2/C$ production characteristics, of the catalysts.

EXAMPLE 3

A commercial zeolite fluid cracking catalyst was physically blended with dolomite powder in the proportions of 90% catalyst with 10% dolomite by weight to obtain Catalyst A. In Catalyst B the dolomite was replaced with inert clay (kaolin). Samples of both Catalysts A and B were impregnated with water/vanadium as in Example 1. The dolomite has the same pore structure characteristics as in Example 1. Each sample was subjected to a hydrothermal deactivation by contacting the catalyst to 100% steam at 2 atms. for 8 hours at 1350° F. The samples were then tested for catalytic cracking activity by the microactivity test. The results are summarized in Table III.

TABLE III

| | Catalyst A | |
|---|---|---|
| % V (wt. %) | 0 | .67% |
| MA (vol. %) | 75.2% | 61.0 |
| $H_2$ (vol. %) | .050 | .072 |
| Coke (wt. %) | 2.53 | 2.20 |

| | Catalyst B | |
|---|---|---|
| % V (wt. %) | 0 | .67% |
| MA (vol. %) | 69.2 | 8.5 |
| $H_2$ (vol. %) | .044 | .275 |
| Coke (wt. %) | 2.45 | 1.28 |

Example 3 clearly shows that basic alkaline earth oxides (dolomite) can be physically blended with standard cracking catalyst to obtain catalytic compositions which possess good activity when impregnated with high levels of vanadium.

EXAMPLE 4

A commercial zeolite FCC catalyst was impregnated to 0.34% V by weight. The catalyst was then screened to retain particles having a size greater than 63 microns. Dolomite powder was similarly screened, except the material having a particle size less than 63 microns was retained. The two sized components were then physically blended together in the proportion of 80% catalyst, 20% dolomite and the blended composition was subjected to a hydrothermal steam deactivation treatment as described in Examples 1, 2 and 3. The dolomite has the same pore structure characteristics as in Example 1. The steamed sample was then separated by rescreening through the same screen to separate the FCC catalyst and dolomite components. Table IV shows the %V before and after hydrothermal treatment of the separated components.

TABLE IV

| Component | V (wt. % before steam treatment) | V (wt. % after steam treatment) |
|---|---|---|
| FCC Catalyst | 0.34 | 0.30 |
| Dolomite | 0.01 | 0.49 |

Example 4 clearly shows that the basic alkaline earth oxide (dolomite) can selectively adsorb vanadium and effectively remove it from the catalyst in a hydrothermal environment such as exists in the regenerator of an FCC process.

The above examples clearly indicate that useful metals tolerance cracking catalysts may be obtained using the teachings of the present invention.

EXAMPLE 5

This example shows the preparation and use of large and small pore MgO based vanadium scavenging additives. A magnesia-silica gel was prepared by mixing a 3.62% $SiO_2$ and 10.87% NaOH aqueous solution with 13.28% $MgCl_2$ aqueous solution at equal flow rates through a mix pump to form a $MgO \cdot SiO_2$ gel with composition 60 wt.% MgO 40 wt.% $SiO_2$. The temperature of the reaction mixture was 30° C. for example A to make smaller pore diameters, and 20° for example B for larger pore diameters. The resultant gel in both cases was filtered, reslurried in water to ~10% solids and spray dried at 330° C. The spray dried material was washed with 70° C. $H_2O$ to remove NaCl. Analytical data in Table V shows the two Samples have similar properties except that the metals tolerance of an 80% commercial FCC catalyst (Super D) 20% additive (either A or B) was dramatically improved for example B. This example clearly demonstrates the importance of the larger pore volume and APD for vanadium scavenging effectiveness.

TABLE V

Analytical and Metals Data for Two MgO Additives
Theoretical Composition
60% MgO
40% $SiO_2$

| | (12817-75A) A | (12817-58A) B |
|---|---|---|
| Run-off Temp. | 30° C. | 20° C. |
| MgO | 64.07 | 62.58 |
| $SiO_2$ | 38.40 | 36.41 |
| PV (200-10,000) cc²/g | .065 | .194 |
| APD (200-10,000) A° | 703 | 624 |
| Metals impregnation of 80% Super D. 20% Additive with .67% V. S-13.5 steam. | | |
| MA | 17 | 41 |
| $H_2$ (vol. %) | .30 | .16 |
| Coke (wt. %) | 2.10 | 1.65 |

EXAMPLE 6

This example again shows the use of high pore volume and low pore volume MgO. Catalyst A is a blend of 80% Super D, 20% commercially available high pore volume MgO (from Martin Marietta grade Mag-Chem-30). Catalyst B is a blend of 80% Super D, 20% commercially available low pore volume MgO (from Martin Marietta grade Mag-Chem 10). Both catalysts are impregnated by the procedure in Example 1. Table VI shows the microactivity results.

TABLE VI

| | Catalyst A | Catalyst B |
|---|---|---|
| PV (20°-10,000) m²/g | .821 | .065 |
| APD (20°-10,000) A° | 1,266 | 3,466 |
| 0% VMA | 67 | 67 |
| $H_2/C$ | .06/2.30 | .04/1.73 |
| .67% VMA | 55 | 13 |
| $H_2/C$ | .08/1.82 | .06/.75 |
| 1.34% VMA | 38 | 11 |
| $H_2/C$ | .11/1.51 | .091 |

I claim:
1. A composition for scavenging vanadium during the catalytic cracking of hydrocarbons comprising a magnesia-silica gel having the weight composition 30 to

80 percent MgO and a pore volume of at least 0.1 cc/g in intra-particle pores having an average pore diameter greater than about 600 Å in pores ranging from about 200 to 10,000 Å in diameter.

2. The compositions of claim 1 wherein the average pore diameter is greater than 1000 Å in pores ranging from about 200 to 10,000 Å in diameter.

3. In a catalyst for the catalytic cracking of vanadium containing hydrocarbons wherein said catalyst comprises synthetic faujasite dispersed in an inorganic oxide matrix and a composition for scavening vanadium, the improvement comprising from about 5 to 80 percent by weight expressed as the oxides of a composition for scavenging vanadium which comprises a magnesia-silica gel having the weight composition 30 to 80 percent MgO, and a pore volume of at least 0.1 cc/g in intra-particle pores having an average pore diameter greater than about 600 Å in pores ranging from about 200 to 10,000 Å in diameter.

4. The composition of claim 3 which includes greater than 0.1 percent by weight vanadium.

5. The composition of claim 3 which includes from about 0.1 to about 10 percent by weight vanadium.

6. The composition of claim 3 wherein said inorganic oxide matrix comprises silica-alumina gel and clay.

7. The composition of claim 3 wherein said vanadium scavenging composition is dispersed in said matrix as a separate oxide phase.

8. The composition of claim 3 wherein said vanadium scavenging composition is physically mixed as a separate particulate additive.

9. The composition of claim 3 wherein said vanadium scavenging composition has a total pore volume of 0.2 to 1.0 cc/g.

10. The composition of claim 3 wherein the vanadium scavenging composition is formed into particles having a size range of 40 to 80 microns.

11. The composition of claim 10 wherein the particles have a density of about 0.5 to 1.0 cc/g.

12. The composition of claim 3 wherein the average pore diameter is greater than about 1000 Å in pores ranging from about 200 to 10,000 Å in diameter.

* * * * *